United States Patent
Greathouse et al.

(10) Patent No.: US 7,241,429 B2
(45) Date of Patent: Jul. 10, 2007

(54) FUEL REFORMER WITH CAP AND ASSOCIATED METHOD

(75) Inventors: Michael W. Greathouse, Columbus, IN (US); Jon J. Huckaby, Westport, IN (US)

(73) Assignee: Arvin Technologies, Inc., Troy, MI (US)

( * ) Notice: Subject to any disclaimer, the term of this patent is extended or adjusted under 35 U.S.C. 154(b) by 757 days.

(21) Appl. No.: 10/452,623

(22) Filed: Jun. 2, 2003

(65) Prior Publication Data

US 2004/0238349 A1 Dec. 2, 2004

(51) Int. Cl.
*B01J 19/08* (2006.01)

(52) U.S. Cl. .......................... 422/186.21; 422/186.22; 123/3

(58) Field of Classification Search ........... 422/186.21, 422/186.22; 123/3
See application file for complete search history.

(56) References Cited

U.S. PATENT DOCUMENTS

| | | | |
|---|---|---|---|
| 4,370,539 A * | 1/1983 | Garlanov et al. ...... | 219/121.57 |
| 4,668,853 A | 5/1987 | Fey et al. | |
| 5,147,998 A | 9/1992 | Tsantrizos et al. | |
| 5,409,784 A | 4/1995 | Bromberg et al. | |
| 5,425,332 A | 6/1995 | Rabinovich et al. | |
| 5,437,250 A | 8/1995 | Rabinovich et al. | |
| 5,887,554 A | 3/1999 | Cohn et al. | |
| 6,035,158 A | 3/2000 | Asakura et al. | |
| 6,037,513 A | 3/2000 | Chang et al. | |
| 6,321,531 B1 | 11/2001 | Caren et al. | |
| 6,322,757 B1 | 11/2001 | Cohn et al. | |
| 6,651,597 B2 * | 11/2003 | Daniel et al. ................. | 123/3 |
| 2004/0033177 A1 | 2/2004 | Brown et al. | |

FOREIGN PATENT DOCUMENTS

| | | |
|---|---|---|
| EP | 1 468 175 | 8/2003 |
| JP | 2001 159372 | 6/2001 |
| JP | 2004 076701 | 3/2004 |
| WO | WO 01/33056 | 5/2001 |

OTHER PUBLICATIONS

U.S. Appl. No. 10/411,917, filed Apr. 11, 2003, Plasmatron Fuel Converter Having Decoupled Air Flow Control.
U.S. Appl. No. 10/158,615, filed May 30, 2002, Low Current Plasmatron Fuel Converter Having Enlarged Volume Discharges.
European Search Report and Annex Thereto for EP 04 25 2793 (3 pages) (Feb. 28, 2005).

* cited by examiner

*Primary Examiner*—Kishor Mayekar
(74) *Attorney, Agent, or Firm*—Barnes & Thornburg LLP

(57) ABSTRACT

A plasma fuel reformer comprises an electrode assembly and a cap. The cap defines an interior region. At least a portion of the electrode assembly is positioned in the interior region.

20 Claims, 6 Drawing Sheets

FUEL REFORMER WITH CAP AND ASSOCIATED METHOD

FIELD OF THE DISCLOSURE

The present disclosure relates generally to fuel reformers and systems and methods associated therewith.

BACKGROUND

Plasma fuel reformers reform hydrocarbon fuel into a reformate gas such as hydrogen-rich gas. In the case of a plasma fuel reformer onboard a vehicle or stationary power generator, the reformats gas produced by the reformer may be utilized as fuel or fuel additive in the operation of an internal combustion engine. The reformate gas may also be utilized to regenerate or otherwise condition an emission abatement device associated with the internal combustion engine or as a fuel for a fuel cell.

SUMMARY

According to the present disclosure, a plasma fuel reformer is provided. The plasma fuel reformer comprises an electrode assembly and a cap. The cap defines an interior region in which at least a portion of the electrode assembly is positioned.

In an exemplary embodiment, the electrode assembly comprises an upper electrode and a lower electrode spaced apart from the upper electrode to define an electrode gap. At least a portion of the upper electrode is positioned in the interior region. The cap is electrically coupled to the lower electrode and configured to block electromagnetic radiation emitted by the upper electrode.

The above and other features of the present disclosure will become apparent from the following description and the attached drawings.

DETAILED DESCRIPTION OF THE DRAWINGS

Figure 1:
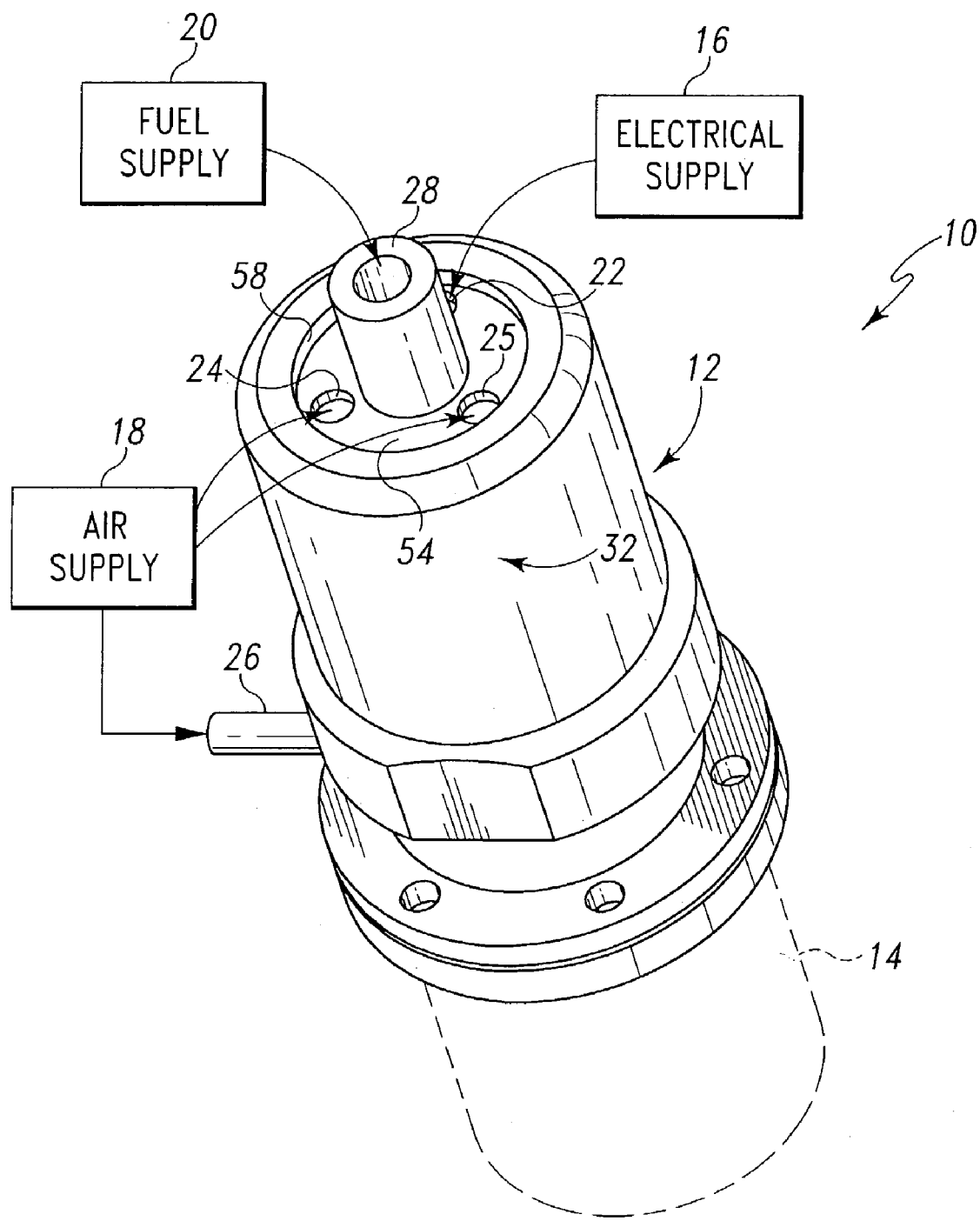
FIG. 1 is a perspective view showing a plasma fuel reformer with a plasma generator shown in solid and a reactor shown in phantom.
Figures 2, 3:
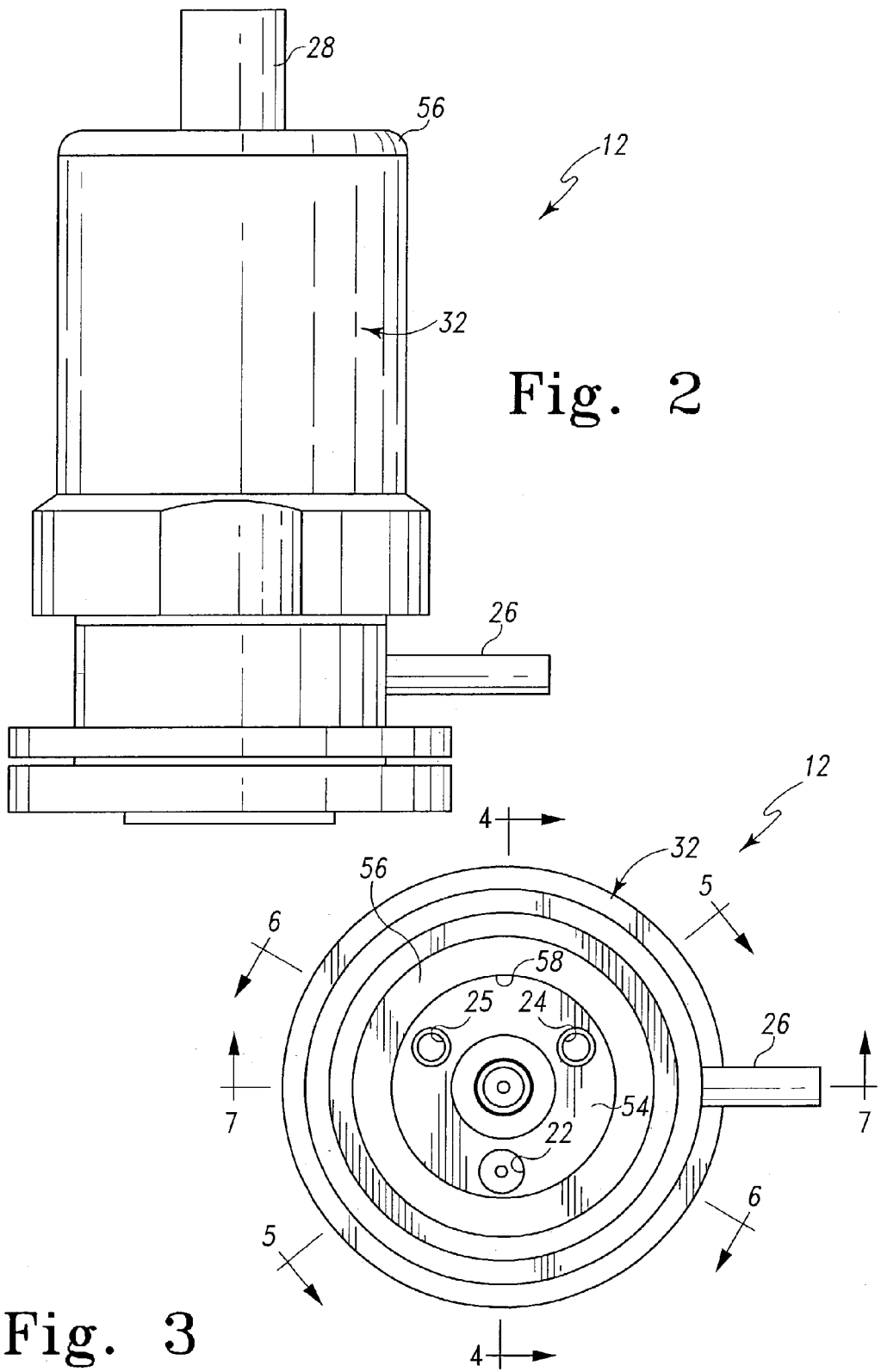
FIG. 2 is an elevational view of the plasma generator.
FIG. 3 is a top plan view of the plasma generator.
Figure 4:
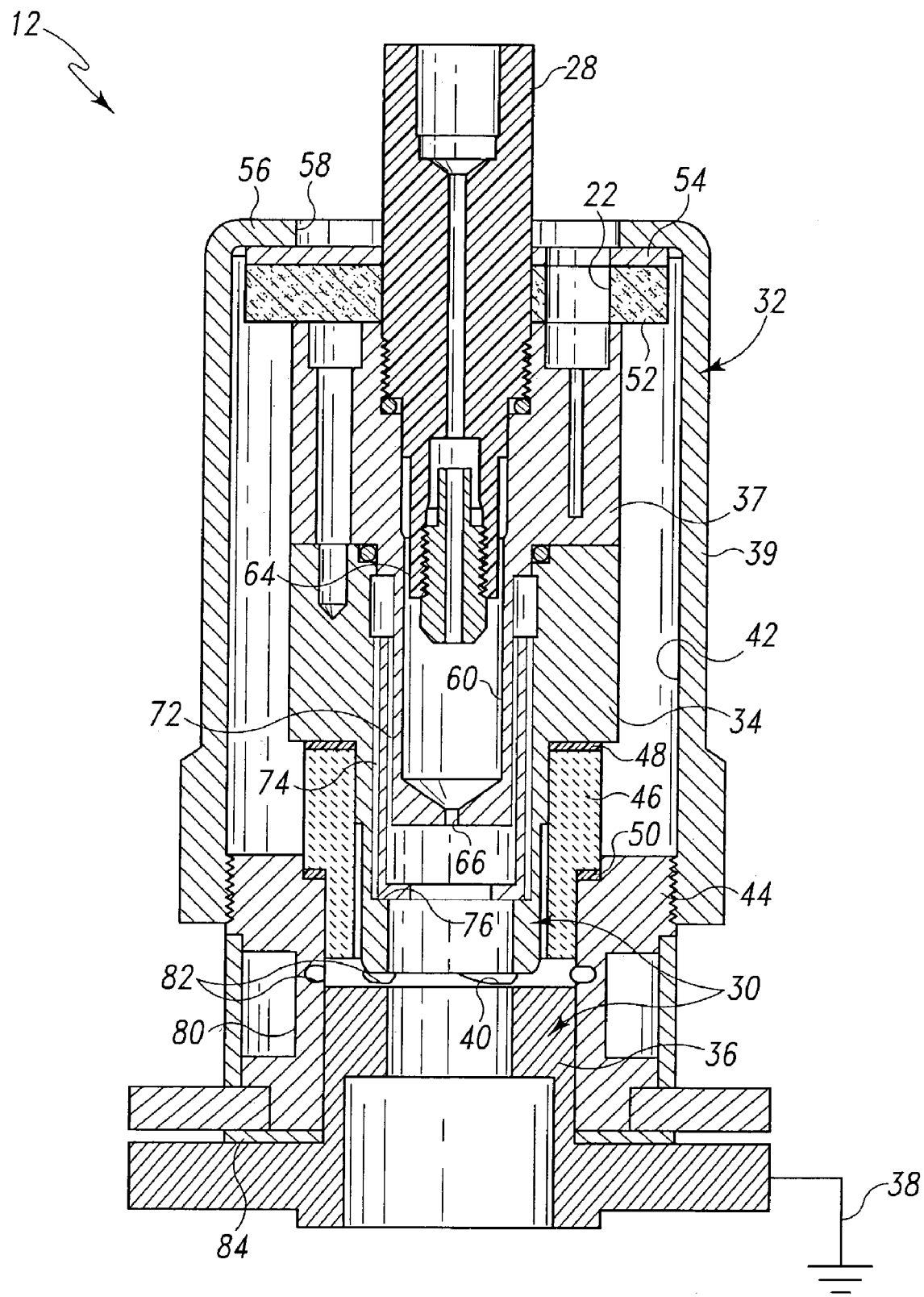
FIG. 4 is a sectional view of the plasma generator taken along lines 4—4 of FIG. 3.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

Referring now to FIG. 1, there is shown a fuel reformer 10. The fuel reformer 10 is embodied as a plasma fuel reformer. A plasma fuel reformer uses plasma (an electrically heated gas) to convert a mixture of air and hydrocarbon fuel into a reformate gas which is rich in, amongst other things, hydrogen gas and carbon monoxide. Systems including plasma fuel reformers are disclosed in U.S. Pat. No. 5,425,332 issued to Rabinovich et al.; U.S. Pat. No. 5,437,250 issued to Rabinovich et al.; U.S. Pat. No. 5,409,784 issued to Bromberg et al.; and U.S. Pat. No. 5,887,554 issued to Cohn, et al., the disclosures of which are hereby incorporated by reference. Additional examples of systems including plasma fuel reformers are disclosed in copending U.S. patent application Ser. No. 10/158,615 entitled "Low Current Plasmatron Fuel Converter Having Enlarged Volume Discharges" which was filed on May 30, 2002 by A. Rabinovich, N. Alexeev, L. Bromberg, D. Cohn, and A. Sarnokhin, along with copending U.S. patent application Ser. No. 10/411,917 entitled "Plasmatron Fuel Converter Having Decoupled Air Flow Control" which was filed on Apr. 11, 2003 by A. Rabinovich, N. Alexeev, L. Bromberg, D. Cohn, and A. Samokhin, the disclosures of both of which are hereby incorporated by reference.

Hydrogen-rich gas generated by the fuel reformer 10 may be supplied to an internal combustion engine (not shown) such as a spark-ignited gasoline engine. In such a case, the internal combustion engine combusts the reformate gas as either the sole source of fuel, or alternatively, as a fuel additive to a hydrocarbon fuel. Alternatively, hydrogen-rich gas generated by the fuel reformer 10 may be supplied to a fuel cell (not shown) such as an alkaline fuel cell (AFC), a phosphoric acid fuel cell (PAFC), a proton exchange membrane fuel cell (PEMFC), a solid oxide fuel cell (SOFC), a molten carbonate fuel cell (MCFC), or any other type of fuel cell. In such a case, the fuel cell utilizes the hydrogen-rich gas in the production of electrical energy. The hydrogen-rich gas from the fuel reformer 10 may also be supplied to an emission abatement device such as a NOx trap or a soot filter to facilitate regeneration thereof.

The fuel reformer 10 comprises a plasma generator 12 and a reactor 14, as shown in FIG. 1. The plasma generator 12 generates a plasma arc using electrical power from an electrical power supply 16. A mixture of air from an air supply 18 and hydrocarbon fuel from a fuel supply 20 passes through the plasma arc and into the reactor 14 to reform the hydrocarbon fuel into a reformate gas. Electrical power is introduced into the plasma generator 12 by use of power connector (not shown) which is advanced through an electrical power inlet 22. Air is introduced into the plasma generator 12 through a pair of upper air inlets 24, 25 and a lower air inlet 26. Fuel is introduced into the plasma generator 12 through a fuel injection assembly 28.

The plasma arc is generated by an electrode assembly 30. During operation of the fuel reformer 10, the electrode assembly 30 generates electromagnetic radiation which could interfere with nearby electrical systems. An electromagnetic cap 32 is used to block electromagnetic radiation emitted by the electrode assembly 30.

The electrode assembly 30 comprises an annular upper electrode 34 and an annular lower electrode 36, as shown in FIGS. 4–7. The upper electrode 34 is electrically coupled to the electrical power supply 16. In particular, an electrical power connector (not shown) electrically coupled to the electrical power supply 16 is attached to an annular upper electrode housing 37 which contacts the upper electrode 34 to supply electrical power thereto. The lower electrode 36 is electrically coupled to ground 38 and is spaced apart from the upper electrode 34 to define an electrode gap 40 therebetween. When energized by the electrical power supply 16, the upper and lower electrodes 34, 36 cooperate to generate the plasma arc across the electrode gap 40.

The cap 32 is configured to block electromagnetic radiation emitted by the upper electrode 34. At least a portion of the upper electrode 34 is positioned in an interior region 42 defined by a cylindrically-shaped sleeve 39 of the cap 32. The cap 32 is electrically coupled to ground 38 via an annular lower electrode housing 44 and the lower electrode 36 which engages the lower electrode housing to discharge electromagnetic radiation blocked by the cap 32.

The cap 32, the lower electrode housing 44, and the lower electrode 36 are electrically insulated from the upper electrode 34 and the upper electrode housing 37. A lower electrical insulator 46 is positioned between the upper electrode 34 and the lower electrode housing 44. A gasket 48 provides a seal between the upper electrode 34 and the lower electrical insulator 46. A gasket 50 provides a seal between the lower electrode housing 44 and the lower electrical insulator 46. An upper electrical insulator 52 is positioned between the upper electrode housing 37 and a spacer 54.

The cap 32 is configured to retain components of the plasma generator 12 in place, as shown in FIGS. 4–7. The sleeve 39 of the cap 32 is threaded to the lower electrode housing 44 to secure the cap 34 thereto. A flange 56 extending radially inwardly from the sleeve 39 engages the spacer 54 to press components between the flange 56 and the housing 44 toward the lower electrode 36 when the sleeve 39 is threaded onto the housing 44. In particular, the flange 56 presses the spacer 54, the upper electrical insulator 52, the upper electrode housing 37, the upper electrode 34, the lower electrical insulator 46, and the gaskets 48, 50 toward the lower electrode 36.

The fuel injection assembly 28 discharges fuel into the interior region 42. To do so, the fuel injection assembly 28 extends through an aperture 58 into the interior region 42, as shown in FIGS. 4–7. The flange 56 defines the aperture 58.

Figure 5:
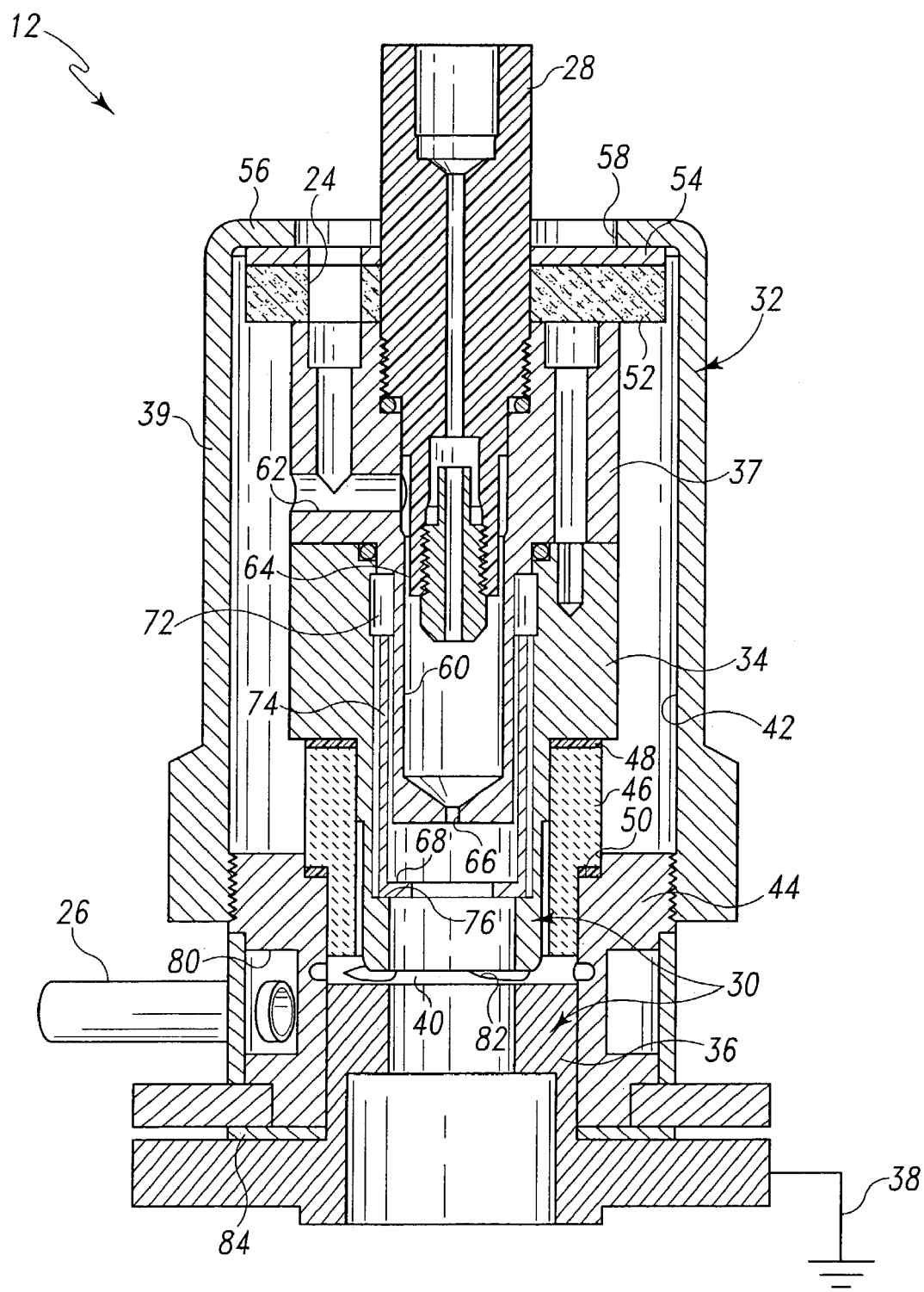
FIG. 5 is a sectional view of the plasma generator taken along lines 5—5 of FIG. 3.

Fuel from the fuel injection assembly 28 is discharged into an upper mixing chamber 60, as shown in FIG. 5. Pressurized air flows from the upper air inlet 24 through an air passageway 62 defined by the upper electrode housing 37 and through an annular air passageway 64 defined between the upper electrode housing 37 and the fuel injection assembly 28 into the upper mixing chamber 60. Air in the mixing chamber 60 mixes with fuel discharged from the fuel injection assembly 28 into the chamber 60.

Figure 6:
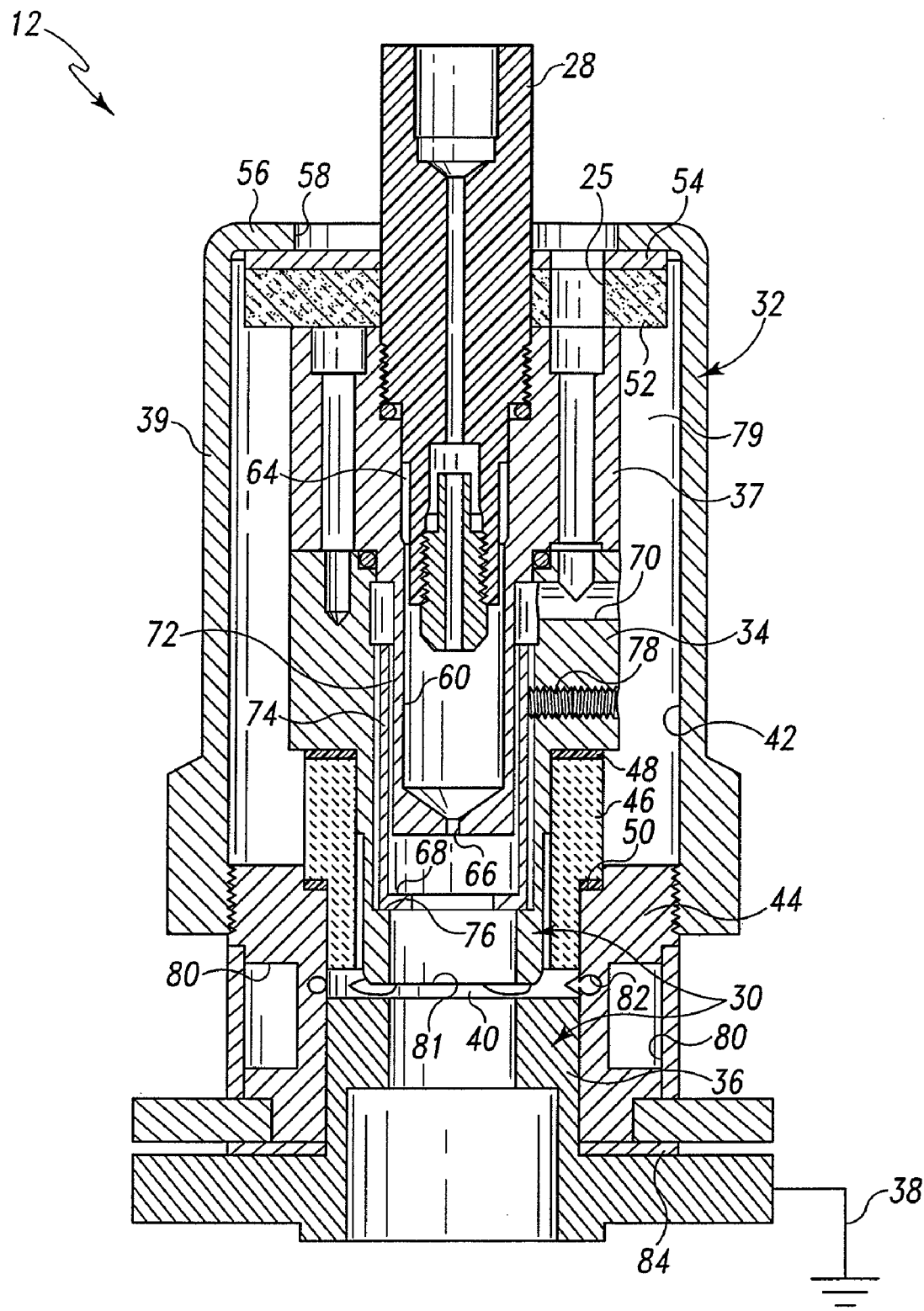
FIG. 6 is a sectional view of the plasma generator taken along lines 6—6 of FIG. 3.

The air-fuel mixture from the upper air mixing chamber 60 is accelerated through a nozzle 66 and flows into an intermediate mixing chamber 68 where it mixes with more pressurized air, as shown in FIG. 6. The additional air flows from the upper air inlet 25 through an air passageway 70 defined by the upper electrode 3 4 and through an annular air passageway 72 defined between the upper electrode housing 37 and an adjustable diaphragm 74 into the intermediate mixing chamber 68. The diaphragm 74 can be moved axially toward or away from an annular shoulder 76 of the upper electrode 34 to adjust the size of the intermediate mixing chamber 68 upon loosening of a set screw 78.

Air can flow between the air passageways 62, 70 through an annular air chamber 79 shown in FIGS. 4–7. The air chamber 79 is defined between the cap 32 and the upper electrode housing 37, upper electrode 34, and insulator 46.

Figure 7:
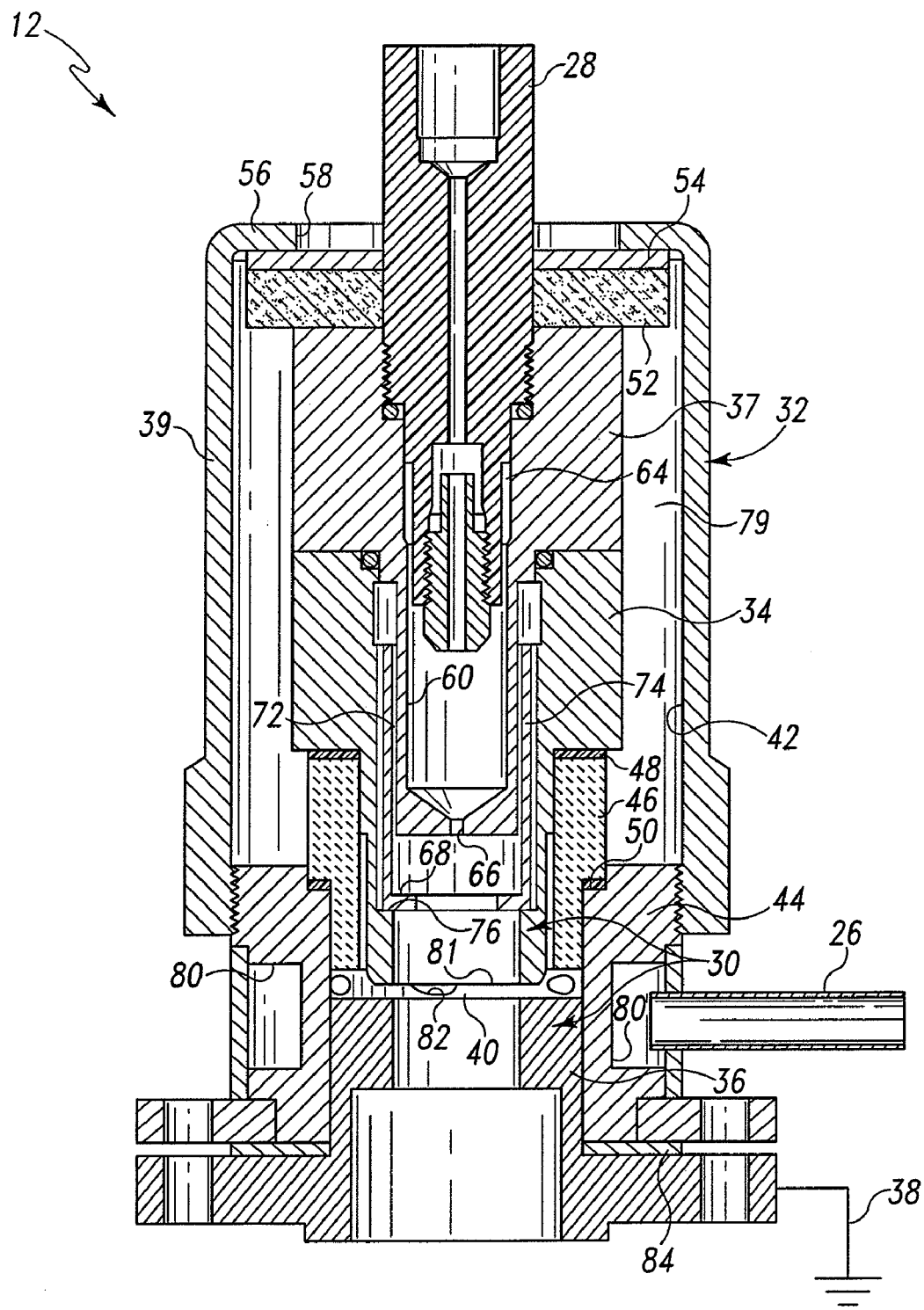
FIG. 7 is a sectional view of the plasma generator taken 7—7 of FIG. 3.

The air-fuel mixture from the intermediate mixing chamber 68 flows into a lower mixing chamber 81 where it mixes with more pressurized air and encounters the plasma arc, as shown in FIG. 7. The additional air flows from the lower air inlet 26 through an annular air chamber 80 and a plurality of swirl holes 82 defined by the lower electrode housing 44 into the lower mixing chamber 81. The swirl holes 82 direct the air radially inwardly through the electrode gap 40 so as to "bend" the plasma arc inwardly. Such bending of the plasma arc ensures that injected fuel is directed through the plasma arc 32. Such bending of the plasma arc also reduces erosion of the electrodes 34, 36. The fuel is reformed into a reformate gas as it flows past the plasma arc and through the reactor 14.

During assembly of the fuel reformer 10, the cap 32 is advanced around at least a portion of the upper electrode 34 to block electromagnetic radiation emitted thereby. The cap 32 is secured to the lower electrode housing 44 and, thus, the lower electrode 36 upon threading the cap 32 to the housing 44. As the cap 32 is threaded onto the housing 44, the flange 56 presses the upper electrode 34 toward the lower electrode 36 to establish the electrode gap 40 therebetween.

The size of the electrode gap 40 can be adjusted. An electrode gap adjustment spacer 84 is positioned between the lower electrode 36 and the lower electrode housing 44. The thickness of the spacer 84 is used to establish the size of the electrode gap 40. A larger spacer 84 can be used to increase the size of the electrode gap 40. A smaller spacer 84 can be used to decrease the size of the electrode gap 40. The spacer 84 is made of, for example, HASTELLOY® X.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the apparatus, method, and system described herein. It will be noted that alternative embodiments of the present disclosure may not include all of the features described yet still benefit from at least some of the advantages of such features. Those of ordinary skill in the art may readily devise their own implementations of an apparatus, method, and system that incorporate one or more of the features of the present disclosure and fall within the spirit and scope of the present invention as defined by the appended claims.

The invention claimed is:

1. A plasma fuel reformer, comprising:
an upper electrode,
a lower electrode spaced apart from the upper electrode to define an electrode gap, and
an electrically-grounded cap defining an interior region, wherein at least a portion of the upper electrode is positioned in the interior region of the cap.

2. The plasma fuel reformer of claim 1, further comprising a lower electrode housing, wherein:
both the lower electrode and the cap are secured to the lower electrode housing.

3. The plasma fuel reformer of claim 2, wherein the cap is threaded to the lower electrode housing.

4. The plasma fuel reformer of claim 1, wherein the lower electrode is electrically grounded.

5. The plasma fuel reformer of claim 1, wherein the cap comprises (i) a cylindrically-shaped sleeve defining the interior region, and (ii) a flange extending radially from the sleeve to press the upper electrode toward the lower electrode.

6. The plasma fuel reformer of claim 5, further comprising a fuel injection assembly and a lower electrode housing engaging the lower electrode, wherein the flange defines an aperture through which the fuel injection assembly extends, and the sleeve is threaded to the lower electrode housing.

7. The plasma fuel reformer of claim 1, further comprising a fuel injection assembly, wherein the cap defines an aperture through which the fuel injection assembly extends into the interior region.

8. The plasma fuel reformer of claim 1, wherein the upper electrode and the cap define at least a portion of an air chamber therebetween.

9. The plasma fuel reformer of claim 1, wherein the cap is configured to block electromagnetic radiation emitted by the upper electrode.

10. A fuel reformer, comprising:
   an electrode assembly, and
   an electrically-grounded cap, the cap defining an interior region, wherein at least a portion of the electrode assembly is positioned in the interior region of the cap.

11. The fuel reformer of claim 10, wherein the fuel reformer is a plasma fuel reformer.

12. The fuel reformer of claim 10, wherein the electrode assembly includes an upper electrode and a lower electrode spaced apart from the upper electrode to define an electrode gap, at least a portion of the upper electrode is positioned in the interior region of the cap, the upper electrode is spaced apart from the cap, and the lower electrode is electrically grounded.

13. The fuel reformer of claim 12, wherein the electrode assembly includes an electrically-grounded lower electrode housing, and the cap is threaded to the lower electrode housing.

14. The fuel reformer of claim 13, wherein the cap comprises (i) a cylindrically-shaped sleeve defining the interior region, and (ii) a flange extending radially from the sleeve to press the upper electrode toward the lower electrode when the cap is threaded to the lower electrode housing.

15. The fuel reformer of claim 12, further comprising a fuel injection assembly, wherein the cap defines an aperture through which the fuel injection assembly extends into the interior region.

16. The fuel reformer of claim 12, wherein the cap is configured to block electromagnetic radiation emitted by the upper electrode.

17. A method of assembling a plasma fuel reformer, the method comprising the step of:
   providing a plasma fuel reformer having an electrically-grounded cap and an electrode assembly;
   advancing the electrically-grounded cap around at least a portion of the electrode assembly.

18. The method of claim 17, further comprising securing the cap to the electrode assembly.

19. The method of claim 17, wherein the electrode assembly comprises an upper electrode and a lower electrode spaced apart from the upper electrode to define an electrode gap, and the advancing step includes advancing the cap around at least a portion of the upper electrode.

20. The method of claim 19, further comprising threading the cap to a lower electrode housing electrically coupled to the lower electrode.

* * * * *